US011570567B2

(12) United States Patent
Nilsson et al.

(10) Patent No.: US 11,570,567 B2
(45) Date of Patent: Jan. 31, 2023

(54) AUDIO COMMUNICATION IN A VEHICLE

(71) Applicant: Ningbo Geely Automobile Research & Development Co., Ltd., Ningbo (CN)

(72) Inventors: Magnus Nilsson, Floda (SE); Jonathan Johansson, Gothenburg (SE)

(73) Assignee: NINGBO GEELY AUTOMOBILE RESEARCH & DEVELOPMENT CO., Ningbo (CN)

(*) Notice: Subject to any disclaimer, the term of this patent is extended or adjusted under 35 U.S.C. 154(b) by 0 days.

(21) Appl. No.: 17/239,630

(22) Filed: Apr. 25, 2021

(65) Prior Publication Data

US 2021/0250721 A1 Aug. 12, 2021

Related U.S. Application Data

(63) Continuation of application No. PCT/CN2019/114204, filed on Oct. 30, 2019.

(30) Foreign Application Priority Data

Nov. 2, 2018 (EP) ..................................... 18204217

(51) Int. Cl.
*H04S 7/00* (2006.01)
*B60R 1/12* (2006.01)
(Continued)

(52) U.S. Cl.
CPC ................ *H04S 7/303* (2013.01); *B60R 1/12* (2013.01); *G06F 3/013* (2013.01); *G06V 20/593* (2022.01);
(Continued)

(58) Field of Classification Search
CPC .... H04S 7/303; G06V 40/161; G06V 20/593; B60R 1/12; B60R 2001/1253;
(Continued)

(56) References Cited

U.S. PATENT DOCUMENTS 4,965,819 A 10/1990 Kannes
2016/0029111 A1 1/2016 Wacquant
(Continued)

FOREIGN PATENT DOCUMENTS

CN 203840450 U 9/2014
EP 2436549 A1 4/2012
(Continued)

OTHER PUBLICATIONS

International Search Report from corresponding International Application No. PCT/CN2019/114204, dated Jan. 6, 2020, 2 pages.

*Primary Examiner* — Paul Kim
*Assistant Examiner* — Douglas J Suthers
(74) *Attorney, Agent, or Firm* — Tucker Ellis LLP

(57) ABSTRACT

An audio communication system for communication between vehicle occupants in a vehicle, including an image capturing device configured to monitor a first vehicle occupant, a processor configured to receive an image of the first vehicle occupant from the image capturing device and determine whether the first vehicle occupant is attracting attention from a second vehicle occupant, a first microphone associated to the first vehicle occupant configured to receive an audio input from the first vehicle occupant in response to the determination of the first vehicle occupant attracting the second vehicle occupant's attention, and a first speaker associated to the second vehicle occupant configured to activate an audio augmentation of the received audio input in the first speaker and output the augmented audio input.

20 Claims, 6 Drawing Sheets

(51) Int. Cl.
  *G06F 3/01* (2006.01)
  *G06V 20/59* (2022.01)
  *G06V 40/16* (2022.01)
  *H04R 3/00* (2006.01)
(52) U.S. Cl.
  CPC .......... G06V 40/161 (2022.01); H04R 3/002 (2013.01); *B60R 2001/1253* (2013.01); *H04R 2410/05* (2013.01); *H04R 2499/13* (2013.01)
(58) Field of Classification Search
  CPC ..... G06F 3/013; H04R 3/002; H04R 2410/05; H04R 2499/13
  USPC .................................................... 381/303, 86
  See application file for complete search history.

(56) References Cited

U.S. PATENT DOCUMENTS

2019/0324279 A1* 10/2019 Hwang .............. G02B 27/0172
2020/0114834 A1*  4/2020 Endo .................. B60R 11/0217

FOREIGN PATENT DOCUMENTS

| JP | 11355748 A | 12/1999 |
| JP | 2010023639 A | 2/2010 |
| WO | 2013144269 A1 | 3/2013 |
| WO | 2013097075 A1 | 7/2013 |

* cited by examiner

AUDIO COMMUNICATION IN A VEHICLE

RELATED APPLICATION DATA

This application is a continuation of International Patent Application No. PCT/CN2019/114204, filed Oct. 30, 2019, which claims the benefit of European Patent Application No. 18204217.6, filed Nov. 2, 2018, the disclosures of which are incorporated herein by reference in their entireties.

TECHNICAL FIELD

The present disclosure relates generally to the field of audio communication in a vehicle. More particularly, it relates to audio communication between vehicle occupants in a vehicle.

BACKGROUND

A vehicle may typically comprise a plurality of vehicle occupants, usually one driver or operator of the vehicle and one or more passengers wherein the driver or operator and one passenger are seated in the front seat of the vehicle and the remaining of the plurality of passengers are seated in the back seat of the vehicle. The vehicle occupants (i.e. the passengers) seated in the back seat of the vehicle may not be able to hear what the vehicle occupants (i.e. the driver or operator of the vehicle) seated in the front seat are talking about and the other way around which may result in a common frustration since it makes communication in the vehicle difficult.

Therefore, there is a need for alternative approaches to audio communication between vehicle occupants in a vehicle.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

An object of some embodiments is to provide alternative approaches to audio communication between vehicle occupants in a vehicle.

According to a first aspect, this is achieved by an audio communication system for communication between vehicle occupants in a vehicle.

The system comprises an image capturing device configured to monitor a first vehicle occupant, a processor configured to receive an image of the first vehicle occupant from the image capturing device and determine whether the first vehicle occupant is attracting attention from a second vehicle occupant.

The system also comprises a first microphone associated to the first vehicle occupant configured to receive an audio input from the first vehicle occupant in response to the determination of the first vehicle occupant attracting the second vehicle occupant's attention, and a first speaker associated to the second vehicle occupant configured to activate an audio augmentation of the received audio input in the first speaker and output the augmented audio input.

An advantage of some embodiments is that a seamless audio communication system in a vehicle is provided.

Another advantage of some embodiments is that conversation in a normal conversation tone without having to raise the voice is enabled.

Yet an advantage of some embodiments is that a vehicle occupant's attention attracting in the vehicle may be determined and an audio augmentation on the vehicle occupants audio input may be activated in response to the determination.

Yet another advantage of some embodiments is that audio augmentation may be activated such that a voice increase in the relevant speakers near that vehicle occupant can be activated.

In some embodiments, the processor is configured for eye-tracking of the first vehicle occupant.

An advantage of some embodiments is that a vehicle occupant's eye movements may indicate attention attracting and thereby identify the vehicle occupant which would like communicate.

In some embodiments, the processor is configured for face and/or lip recognition of the first vehicle occupant.

An advantage of some embodiments is that a vehicle occupant's face and/or lip movements may indicate attention attracting and thereby identify the vehicle occupant which would like communicate.

In some embodiments, the processor is configured for determining a position and/or movement of the first vehicle occupant.

An advantage of some embodiments is that a vehicle occupant's position and/or movement may indicate attention attracting and thereby identify the vehicle occupant which would like communicate.

In some embodiments, the image capturing device is further configured to monitor the second vehicle occupant.

An advantage of some embodiments is that a further vehicle occupant's attention attracting in the vehicle may be determined for a two-way communication.

In some embodiments, the image capturing device comprises a rear-view mirror configured to be mounted in the front of the vehicle interior.

An advantage of some embodiments is that a seamless audio communication system in a vehicle is provided.

In some embodiments, the audio communication system further comprises a second microphone associated to the second vehicle occupant configured to receive an audio input from the second vehicle occupant in response to a determination of the second vehicle occupant attracting the first vehicle occupant's attention. The system also comprises a second speaker associated to the first vehicle occupant configured to activate the audio augmentation of the received audio input in the second speaker and output the augmented audio input.

An advantage of some embodiments is that a further vehicle occupant's attention attracting in the vehicle may be determined and an audio augmentation on the vehicle occupants audio input may be activated in response to the determination for a two-way communication.

In some embodiments, the processor is configured to determine a seating position of the vehicle occupant in the vehicle.

An advantage of some embodiments is that a vehicle occupant's determined seating position may identify the associated microphone and the associated speaker of that vehicle occupant.

In some embodiments, the microphone and the speaker are positioned in proximity of the seating position.

An advantage of some embodiments is that the associated microphone and the associated speaker of that vehicle occupant for the seating position may function appropriately for reception of audio input and for audio augmentation.

In some embodiments, the audio augmentation comprises a controlled increase of the audio input and/or a noise cancellation of the audio input.

An advantage of some embodiments is that the audio input is controllably increased to such a level for the vehicle occupant to perceive it as normal conversation tone. Another advantage of some embodiments is that any possible noise in the vehicle e.g. an ongoing parallel conversation in the vehicle may be cancelled i.e. removed from the augmented audio.

A second aspect is a vehicle comprising the audio communication system of the first aspect.

A third aspect is an audio communication method for communication between vehicle occupants in a vehicle.

The method comprises monitoring, by an image capturing device, a first vehicle occupant, and receiving, by a processor, an image of the first vehicle occupant from the image capturing device.

The method also comprises determining, by the processor, whether the first vehicle occupant is attracting attention from a second vehicle occupant.

The method further comprises receiving, by a first microphone associated to the first vehicle occupant, an audio input from the first vehicle occupant in response to the determination of the first vehicle occupant attracting the second vehicle occupant's attention, and activating an audio augmentation of the received audio input in a first speaker associated to the second vehicle occupant, and outputting, by the first speaker associated to the second vehicle occupant, the augmented audio input.

An advantage of some embodiments is that a seamless audio communication method in a vehicle is provided.

Another advantage of some embodiments is that conversation in a normal conversation tone without having to raise the voice is enabled.

Yet an advantage of some embodiments is that a vehicle occupant's attention attracting in the vehicle may be determined and an audio augmentation on the vehicle occupants audio input may be activated.

Yet another advantage of some embodiments is that audio augmentation may be activated such that a voice increase in the relevant speakers near that vehicle occupant can be activated.

In some embodiments, the method further comprises monitoring, by the image capturing device, the second vehicle occupant, and receiving, by the processor, an image of the second vehicle occupant from the image capturing device.

The method also comprises determining, by the processor, whether the second vehicle occupant is attracting attention from a first vehicle occupant.

The method further comprises receiving, by a second microphone associated to the second vehicle occupant, an audio input from the second vehicle occupant in response to the determination of the second vehicle occupant attracting the first vehicle occupant's attention, activating an audio augmentation of the received audio input in a second speaker associated to the first vehicle occupant, and outputting, by the second speaker associated to the first vehicle occupant, the augmented audio input.

An advantage of some embodiments is that a further vehicle occupant's attention attracting in the vehicle may be determined and an audio augmentation on the vehicle occupants audio input may be activated in response to the determination for a two-way communication.

In some embodiments, the method further comprises determining the seating position of the vehicle occupant in the vehicle.

An advantage of some embodiments is that a vehicle occupant's determined seating position may identify the associated microphone and the associated speaker of that vehicle occupant.

In some embodiments, the audio augmentation comprises a controlled increase of the audio input and/or a noise cancellation of the audio input.

An advantage of some embodiments is that the audio input is controllably increased to such a level for the vehicle occupant to perceive it as normal conversation tone. Another advantage of some embodiments is that any possible noise in the vehicle e.g. an ongoing parallel conversation in the vehicle may be cancelled i.e. removed from the augmented audio.

A fourth aspect is a computer program product comprising a non-transitory computer readable medium, having thereon a computer program comprising program instructions. The computer program is loadable into a data processing unit and configured to cause execution of the method according to the third aspect when the computer program is run by the data processing unit.

In some embodiments, any of the above aspects may additionally have features identical with or corresponding to any of the various features as explained above for any of the other aspects.

An advantage of some embodiments is that one or more microphones in the audio communication system may only be activated once it has been determined that the vehicle occupant is attracting attention in the vehicle which reduces the power consumption compared to having the microphones activated at all times and listening for any audio input.

Another advantage of some embodiments is that the determination that the vehicle occupant is in fact attracting attention in the vehicle minimizes any unintentional activations of the microphones and thereby also reduces power consumption.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where alternative approaches to audio communication between vehicle occupants in a vehicle are provided.

Figure 1A:
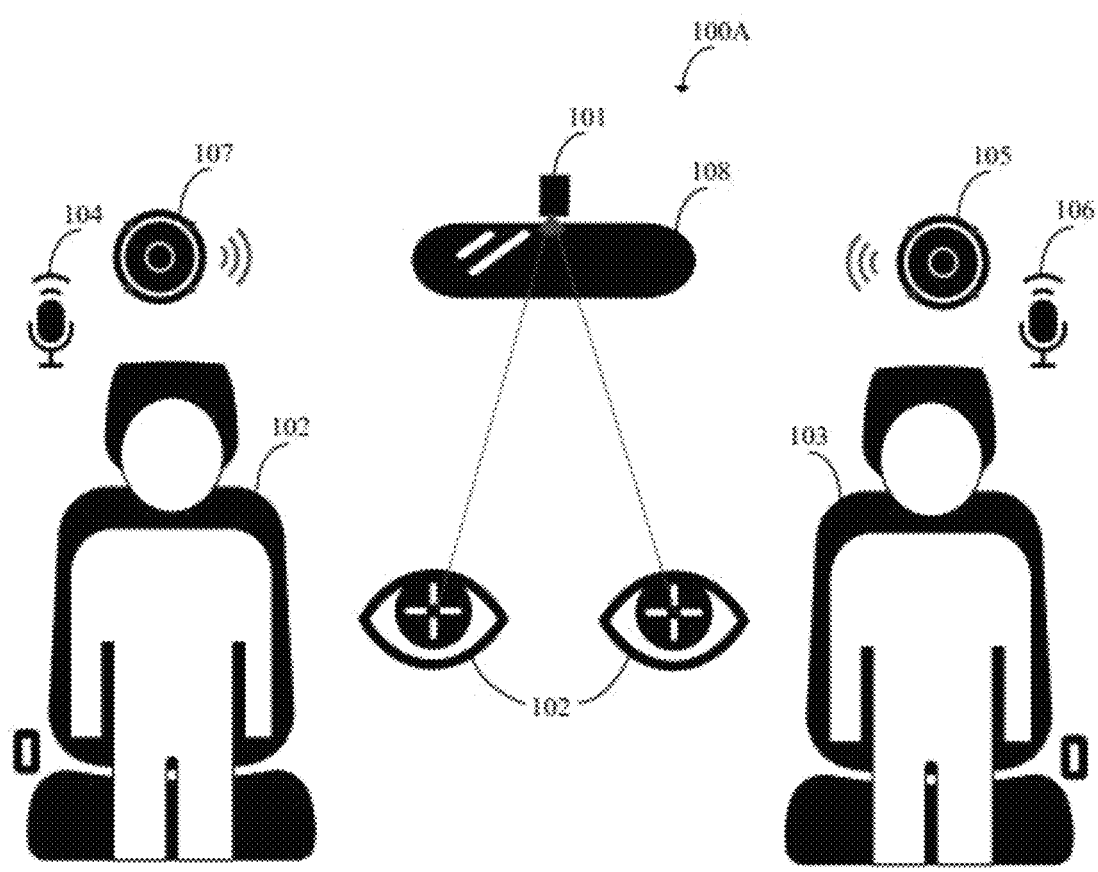
FIG. 1A is a schematic overview illustrating an example system according to some embodiments.

FIG. 1A is a schematic overview illustrating an example audio communication system according to some embodiments. The audio communication system 100A for communication between vehicle occupants 102,103 in a vehicle comprises an image capturing device 101 comprising a rear-view mirror 108 configured to be mounted in the front of the vehicle interior and configured to monitor a first vehicle occupant 102. The image capturing device 101 may be configured for eye tracking of the first vehicle occupant 102. In addition to eye tracking, the image capturing device 101 may be configured for face and/or lip recognition or for determining a position and/or movement of the first vehicle occupant 102.

The audio communication system 100A further comprises a processor (not shown) configured to receive an image of the first vehicle occupant 102 from the image capturing device 101 and determine whether the first vehicle occupant is attracting attention from a second vehicle occupant 103. A first microphone 104 associated to the first vehicle occupant 102 is configured to receive an audio input from the first vehicle occupant 102 in response to the determination of the first vehicle occupant 102 attracting the second vehicle occupant's 103 attention. A first speaker 105 associated to the second vehicle occupant 103 is configured to activate an audio augmentation of the received audio input in the first speaker 105 and output the augmented audio input.

In some embodiments, the image capturing device 101 is in addition further configured to monitor the second vehicle occupant 103 for a two-way communication.

The audio communication system 100A further comprises a second microphone 106 associated to the second vehicle occupant 103 configured to receive an audio input from the second vehicle occupant 103 in response to a determination of the second vehicle occupant 103 attracting the first vehicle occupant's attention 102. The audio communication system 100A further comprises a second speaker 107 associated to the first vehicle occupant 102 configured to activate the audio augmentation of the received audio input in the second speaker 107 and output the augmented audio input.

The processor (not shown) in the audio communication system 100A is further configured to determine a seating position of the vehicle occupant in the vehicle in order to determine the associated microphone and speaker for that seating position.

The microphones 104, 106 and the speakers 105,107 in the audio communication system 100A are positioned in proximity of the seating position for ensuring appropriate performance.

The audio augmentation in the audio communication system 100A comprises a controlled increase of the audio input and/or a noise cancellation of the audio input in order to controllably increase the audio input to such a level for the vehicle occupant to perceive it as normal conversation tone. In addition, any possible noise in the vehicle e.g. an ongoing parallel conversation in the vehicle or any other disturbing vehicle noise may be cancelled i.e. removed from the augmented audio.

The audio communication system 100A may be comprised in a vehicle.

Figure 1B:
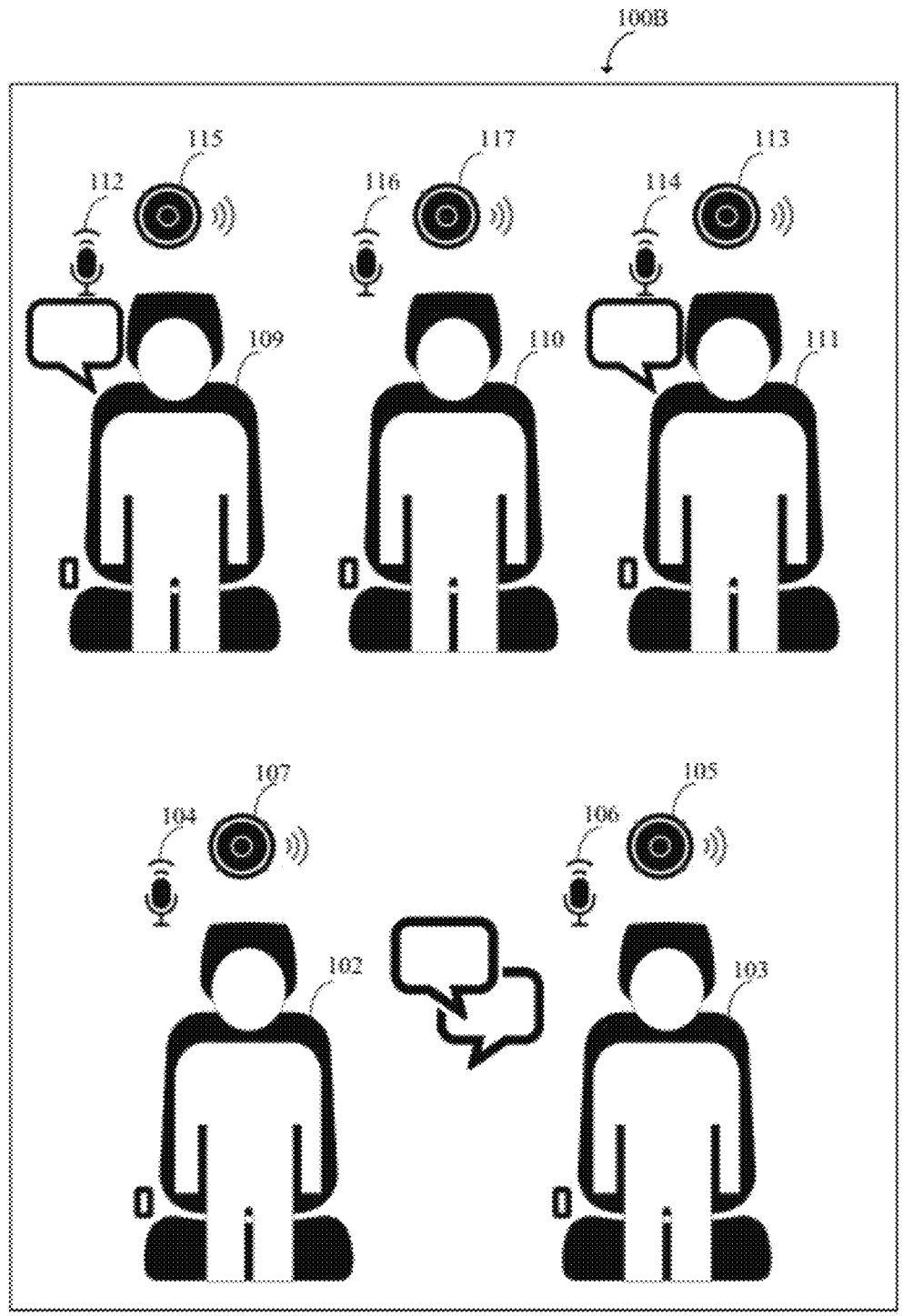
FIG. 1B is a schematic overview illustrating an example system according to some embodiments.

FIG. 1B is a schematic overview illustrating an example audio communication system according to some embodiments. The audio communication system 100B for communication between vehicle occupants 102,103 seated in the front seat and vehicle occupants 109,110,111 seated in the back seat in a vehicle. The vehicle occupants seated in the front seat 102,103 may communicate via the audio communication system 100B with the vehicle occupants 109,110, 111 seated in the back seat and vice versa. The vehicle occupants 102,103 or 109,110,111 seated in the same seat row may also communicate with each other via the audio communication system 100B. A first microphone 104 associated to the first vehicle occupant 102 sitting in the front seat is configured to receive an audio input from the first vehicle occupant 102 in response to the determination of the first vehicle occupant 102 attracting the second vehicle occupant's 103 attention. A first speaker 105 associated to the second vehicle occupant 103 is configured to activate an audio augmentation of the received audio input in the first speaker 105 and output the augmented audio input. The vehicle occupants 109,110,111 have corresponding associated microphones 112,114,116 configured to receive audio input and associated speakers 113,115,117 configured to activate audio augmentation of the received audio input. One or several vehicle occupants, either seated in the same seat row or in other seat rows in the vehicle may communicate with each other via the associated microphones and speakers comprised in the audio communication system 100B which thereby enables one-to-one communication, one-to-many communication or many-to-many communication based on which vehicle occupants are to be included in the communication.

The audio communication system 100B may be comprised in a vehicle.

Figure 2:
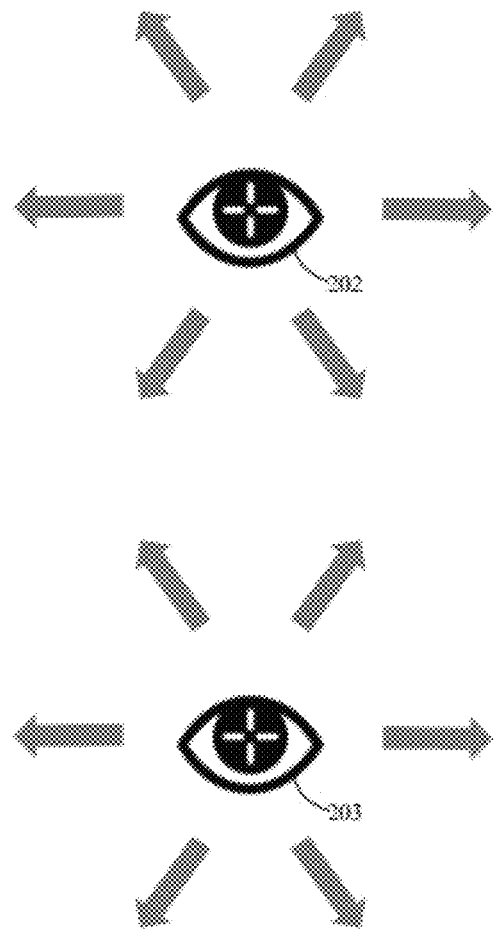
FIG. 2 is a schematic drawing illustrating an example eye movement according to some embodiments.

FIG. 2 is a schematic drawing illustrating an example eye movement according to some embodiments. The audio communication system 100A,100B (illustrated in FIGS. 1A and 1B) for communication between vehicle occupants 102,103,109,110,111 in a vehicle comprises the image capturing device 101 configured to monitor a vehicle occupant 102,103,109,110,111 and e.g. the eye movements 202,203 of the vehicle occupant 102,103 are monitored via an eye tracking function of the image capturing device 101. The eye tracking function may determine in which direction the eyes 202,203 of the vehicle occupant 102,103 are looking at or gazing towards.

An activity which may determine that a vehicle occupant 102 is attracting attention from another vehicle occupant 103 is a focus (e.g. a look or a gaze) of the eyes on the other vehicle occupant in the vehicle for a specified duration of time (e.g. 1 second) in order to distinguish the intentional attention attracting from unintentional activations of the audio communication system 100A, 100B.

In order to determine attention attracting, a criteria of actually focusing (e.g. a look or a gaze) for at least a specified duration of time (e.g. 1 second) at the vehicle occupant from which attention is attracted needs to be fulfilled in order to set up a communication link. In addition, a criteria of providing audio input (i.e. starting an audio communication by a vehicle occupant) needs to be fulfilled. There is no required order of these criteria, either the vehicle occupant starts talking first and then focuses the eyes on the other vehicle occupant whom he is attracting attention from or the other way around and once both criteria have been fulfilled the communication link is established between these. Once the vehicle occupants have stopped talking (i.e. stopped providing audio input) and/or the focus of the eyes have been lost then the communication link will still remain established and active for another specified duration of time (e.g. 20 seconds) in case the vehicle occupants would like to resume the communication again and thereby leaving room for a brief paus in the conversation.

Furthermore, if focus is on several vehicle occupants in the vehicle then several vehicle occupants may be connected to the communication link in a group communication, hence the audio system is not limited to a one-to-one communication but may also be a one-to-many communication or a many-to-many communication based on which vehicle occupants are to be included in the communication.

As alternatives or in addition to the eye tracking function, the image capturing device 101 (illustrated in FIG. 1) may be further configured for face and/or lip recognition or for determining a position and/or movement of the vehicle occupant(s).

In these alternatives or additions, a specific face expression or lip movements of the vehicle occupant for at least a specified duration of time might be determined to be attention attracting and thereby fulfilling the criteria of attracting attention. Following this determination, the criteria of providing audio input (i.e. starting an audio communication by a vehicle occupant) also needs to be fulfilled. Further, in addition or as an alternative to eye movements and face expressions and lip movements, also a position and/or movement of the vehicle occupant(s) for at least a specified duration of time might be determined to be attention attracting and thereby also fulfilling the criteria of attracting attention.

Figure 3:
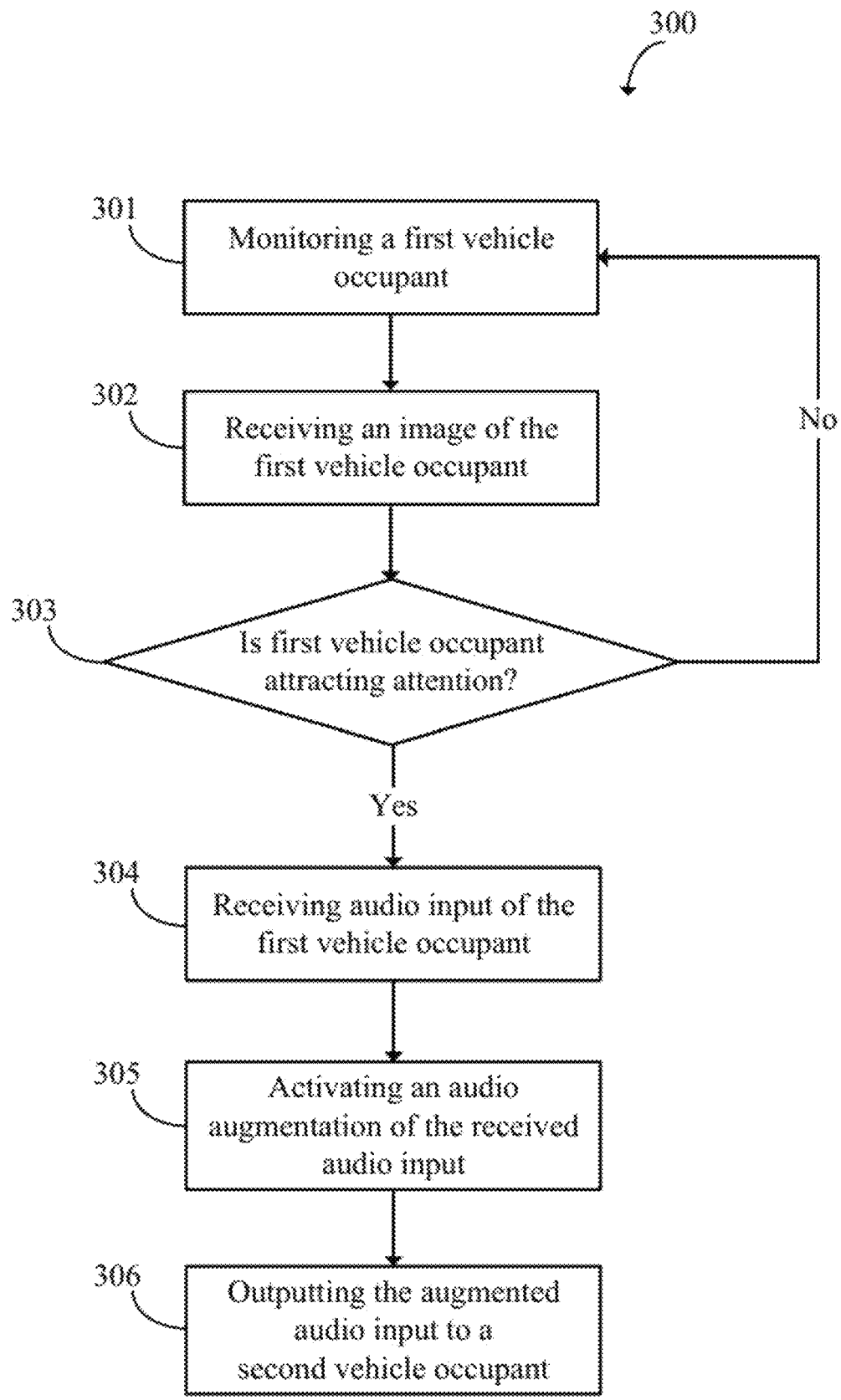
FIG. 3 is a flowchart illustrating example method steps according to some embodiments.

FIG. 3 is a flowchart illustrating example method steps according to some embodiments. The audio communication method 300 is for communication between vehicle occupants in a vehicle. Thus, the method 300 may, for example, be performed by the audio communication system 100A, 100B of FIG. 1A,1B.

In step 301, an image capturing device monitors a first vehicle occupant.

For example, the monitoring may comprise monitoring eye movements e.g. a look in or a gaze towards a direction, and/or face expressions, and/or lip movements, and/or a position or a movement of the vehicle occupant(s).

In step 302, a processor receives an image of the first vehicle occupant from the image capturing device monitoring the first vehicle occupant.

In step 303, the processor determines whether the first vehicle occupant is attracting attention from a second vehicle occupant.

For example, the processor determines attention attracting by analyzing any one of: eye movements, face expressions, lip movements, and position or movement of vehicle occupant(s) for at least a specified duration of time.

In step 304, a first microphone associated to the first vehicle occupant receives an audio input from the first vehicle occupant in response to the determination of the first vehicle occupant attracting the second vehicle occupant's attention such that a communication link can be established.

In step 305, a first speaker associated to the second vehicle occupant activates an audio augmentation of the received audio input.

In step 306, the first speaker associated to the second vehicle occupant outputs the augmented audio input.

In some embodiments, the method further comprises determining the seating position of the vehicle occupant in the vehicle.

In some embodiments, the audio augmentation comprises a controlled increase of the audio input and/or a noise cancellation of the audio input.

Figure 4:
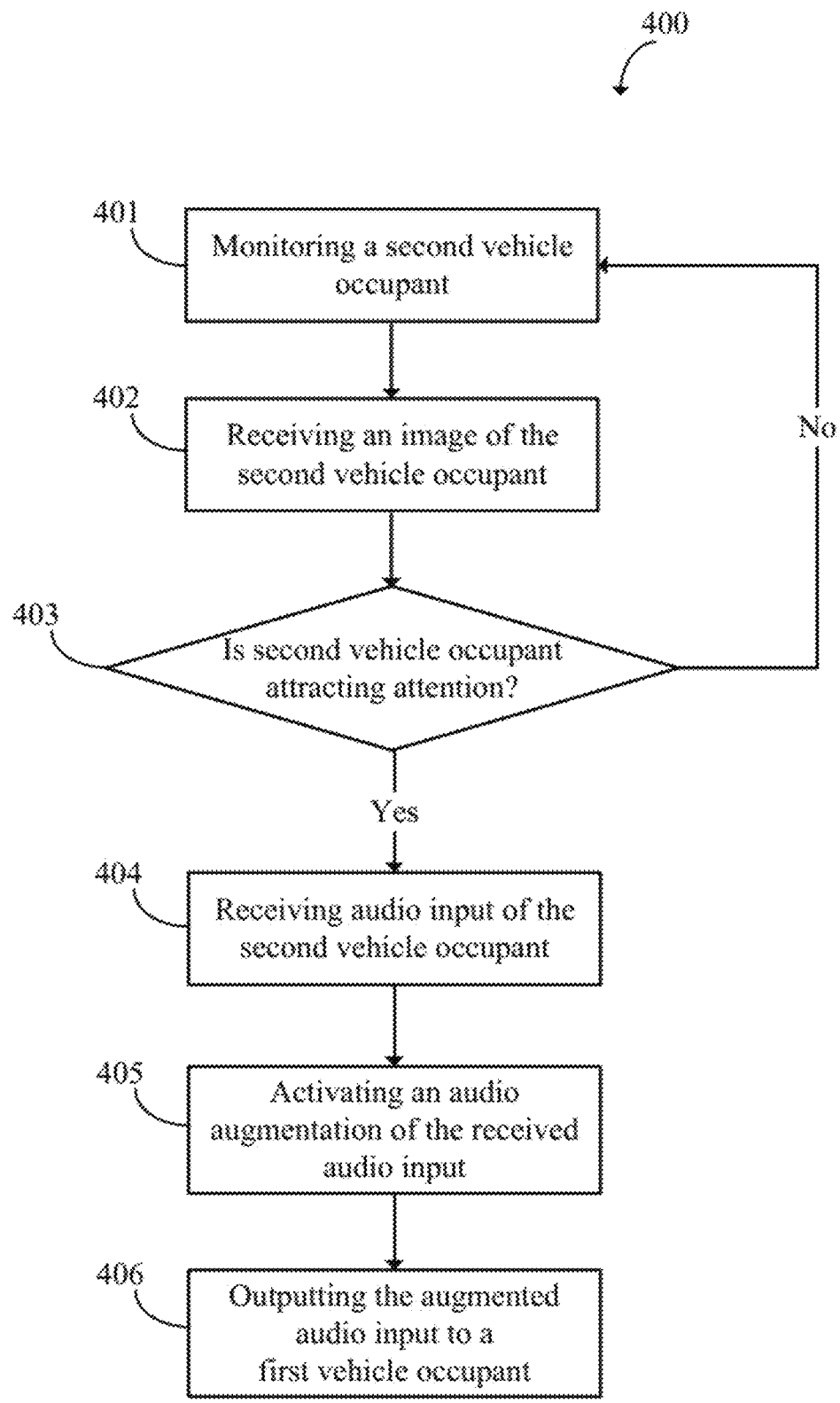
FIG. 4 is a flowchart illustrating example method steps according to some embodiments.

FIG. 4 is a flowchart illustrating example method steps according to some embodiments. The audio communication method 400 is for communication between vehicle occupants in a vehicle. Thus, the method 400 may, for example, be performed by the audio communication system 100A, 100B of FIG. 1A,1B.

In step 401, the image capturing device monitors the second vehicle occupant.

In step 402, the processor receives an image of the second vehicle occupant from the image capturing device monitoring the second vehicle occupant.

In step 403, the processor determines whether the second vehicle occupant is attracting attention from a first vehicle occupant.

In step 404, a second microphone associated to the second vehicle occupant receives an audio input from the second vehicle occupant in response to the determination of the second vehicle occupant attracting the first vehicle occupant's attention such that a communication link can be established.

In step 405, a second speaker associated to the first vehicle occupant activates an audio augmentation of the received audio input.

In step 406, the second speaker associated to the first vehicle occupant outputs the augmented audio input.

Figure 5:
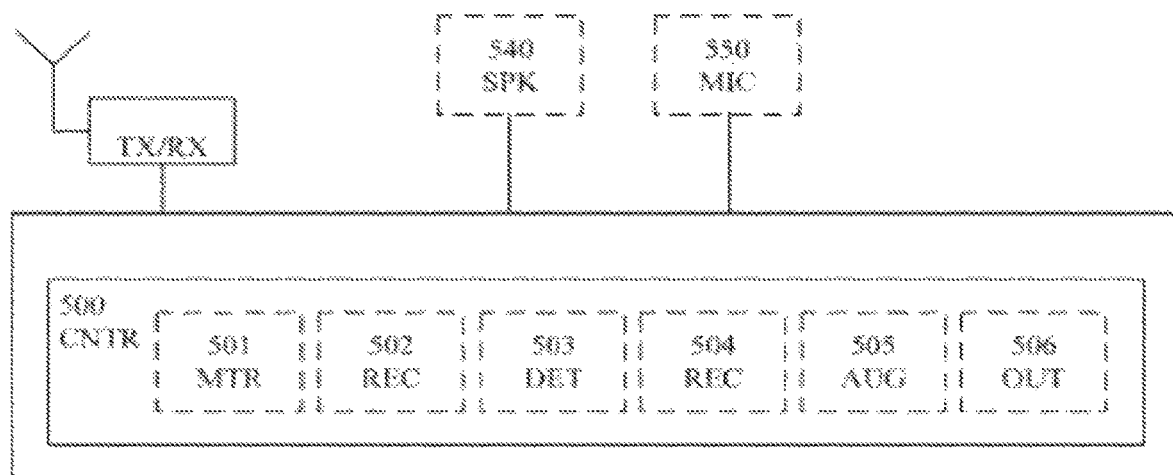
FIG. 5 is a schematic block diagram illustrating an example arrangement according to some embodiments.

FIG. 5 is a schematic block diagram illustrating an example arrangement according to some embodiments. The example arrangement is an audio communication arrangement 500 for communication between vehicle occupants in a vehicle, wherein the arrangement is configured to be associated with speaker arrangement SPK 540, e.g. speaker circuitry, and microphone arrangement MIC 550, e.g. microphone circuitry.

The audio communication arrangement 500 comprises monitoring arrangement MTR 501, e.g. monitoring circuitry, configured to monitor a first vehicle occupant, receiving arrangement REC 502, e.g. receiving circuitry, configured to receive an image of the first vehicle occupant, determining arrangement DET 503, e.g. determining circuitry, configured to determine whether the first vehicle occupant is attracting attention from a second vehicle occupant, receiving arrangement REC 504, e.g. receiving circuitry, configured to receive an audio input from the first vehicle occupant, augmenting arrangement AUG 505, e.g. augmenting circuitry, configured to activate an audio augmentation of the received audio input, and outputting arrangement OUT 506, e.g. outputting circuitry, configured to output the augmented audio input.

The audio communication arrangement 500 may be comprised in the audio communication system 100A, 100B described in connection with FIGS. 1A,1B and 2 and/or the audio communication arrangement 500 may be configured to perform method steps of any of the methods described in connection with FIGS. 3 and 4.

Figure 6:
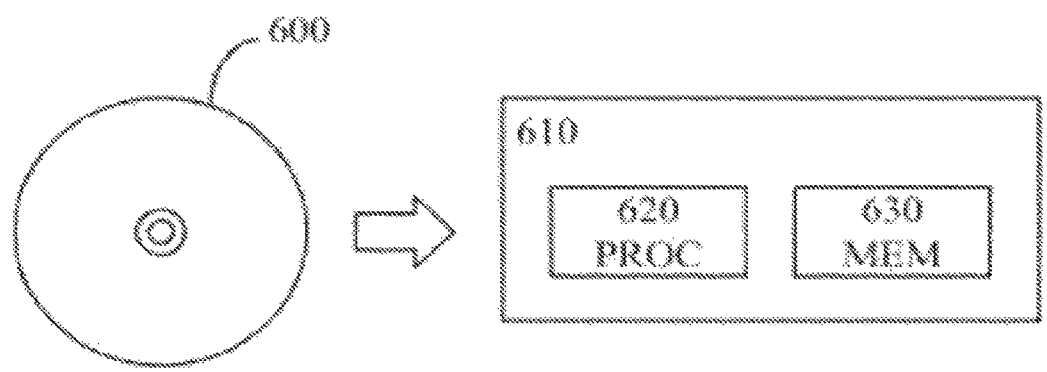
FIG. 6 is a schematic drawing illustrating an example computer readable medium according to some embodiments.

FIG. 6 is a schematic drawing illustrating an example computer readable medium according to some embodiments. The computer program product comprises a non-transitory computer readable medium 600 having thereon a computer program 610 comprising program instructions, wherein the computer program being loadable into a data processing unit and configured to cause execution of the method steps of any of the methods described in connection with FIGS. 3 and 4.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a vehicle.

Embodiments may appear within an electronic apparatus (associated with or comprised in a vehicle) comprising arrangements, circuitry, and/or logic according to any of the embodiments described herein. Alternatively or additionally, an electronic apparatus (associated with or comprised in a vehicle) may be configured to perform methods according to any of the embodiments described herein.

According to some embodiments, a computer program product comprises a computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC) 620, which may, for example, be comprised in a vehicle 610. When loaded into the data processing unit, the computer program may be stored in a memory (MEM) 630 associated with or comprised in the data-processing unit. According to some embodiments, the computer program may, when loaded into and run by the data processing unit, cause execution of method steps according to, for example, any of the methods illustrated in FIGS. 3 and 4 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. An audio communication system for communication between vehicle occupants in a vehicle, comprising:
    an image capturing device configured to monitor a first vehicle occupant,
    a processor configured to receive an image of the first vehicle occupant from the image capturing device and determine whether the first vehicle occupant is directing attention to a second vehicle occupant from eye movement of the first vehicle occupant, the processor configured for eye-tracking of the first vehicle occupant to determine whether the first vehicle occupant is directing attention to the second vehicle occupant based on whether the eye movement of the first vehicle occupant comprises a focus of the first vehicle occupant's eyes on the second vehicle occupant for at least a specified duration of time,
    a first microphone associated to the first vehicle occupant configured to receive an audio input from the first vehicle occupant in response to determining the first vehicle occupant is directing attention to the second vehicle occupant, and
    an audio communication controller configured to activate an audio augmentation of the received audio input from the first microphone to augment the audio input and output the augmented audio via a first speaker associated to the second vehicle occupant.

2. The audio communication system according to claim 1, wherein the specified duration of time indicative of the first vehicle occupant directing attention to the second vehicle occupant is 1 second.

3. The audio communication system according to claim 1, wherein the processor is further configured for face and/or lip recognition of the first vehicle occupant, wherein determining whether the first vehicle occupant is directing attention to the second vehicle occupant is further based on recognizing specific face expressions and/or lip movements of the first vehicle occupant for at least the specified duration of time which are indicative of directing attention.

4. The audio communication system according to claim 1, wherein the processor is further configured for determining a position and/or movement of the first vehicle occupant, wherein determining whether the first vehicle occupant is directing attention to the second vehicle occupant is further based on determining whether the position and/or movement of the first vehicle occupant for at least the specified duration of time is indicative of directing attention.

5. The audio communication system according to claim 1, wherein the image capturing device is further configured to monitor the second vehicle occupant.

6. The audio communication system according to claim 1, wherein the image capturing device comprises a rear-view mirror configured to be mounted in the front of the vehicle interior.

7. The audio communication system according to claim 5, wherein the audio communication system further comprises:
the processor further configured to receive an image of the second vehicle occupant from the image capturing device and determine whether the second vehicle occupant is directing attention to the first vehicle occupant from eye movement of the second vehicle occupant, the processor configured for eye-tracking of the second vehicle occupant to determine whether the second vehicle occupant is directing attention to the first vehicle occupant based on whether the eye movement of the second vehicle occupant comprises a focus of the second vehicle occupant's eyes on the first vehicle occupant for at least the specified duration of time,
a second microphone associated to the second vehicle occupant configured to receive an audio input from the second vehicle occupant in response to determining the second vehicle occupant is directing attention to the first vehicle occupant, and
the audio communication controller configured to activate the audio augmentation of the received audio input from the second microphone to augment the audio input and output the augmented audio via a second speaker associated to the first vehicle occupant.

8. The audio communication system according to claim 1, wherein the processor is configured to determine a seating position of the first vehicle occupant in the vehicle.

9. The audio communication system according to claim 8, wherein the first microphone and the first speaker are positioned in proximity of the seating position.

10. The audio communication system according to claim 1, wherein the audio augmentation comprises a controlled increase of the audio input and/or a noise cancellation of the audio input.

11. A vehicle comprising the audio communication system according to claim 1.

12. The audio communication system according to claim 1, wherein the first microphone is configured to activate in response to determining the first vehicle occupant is directing attention to the second vehicle occupant.

13. An audio communication method for communication between vehicle occupants in a vehicle, the method comprising:
monitoring, by an image capturing device, a first vehicle occupant,
receiving, by a processor, an image of the first vehicle occupant from the image capturing device,
determining, by the processor, whether the first vehicle occupant is directing attention to a second vehicle occupant from eye movement of the first vehicle occupant, the processor eye-tracking the first vehicle occupant to determine whether the first vehicle occupant is directing attention to the second vehicle occupant based on whether the eye movement of the first vehicle occupant comprises focusing of the first vehicle occupant's eyes on the second vehicle occupant for at least a specified duration of time,
receiving, by a first microphone associated to the first vehicle occupant, an audio input from the first vehicle occupant in response to determining the first vehicle occupant is directing attention to the second vehicle occupant,
activating, by an audio communication controller, an audio augmentation of the received audio input from the first microphone to augment the audio input, and
outputting, by a first speaker associated to the second vehicle occupant, the augmented audio.

14. The audio communication method according to claim 13, further comprising:
monitoring, by the image capturing device, the second vehicle occupant,
receiving, by the processor, an image of the second vehicle occupant from the image capturing device,
determining, by the processor, whether the second vehicle occupant is directing attention to the first vehicle occupant from eye movement of the second vehicle occupant, the processor eye-tracking the second vehicle occupant to determine whether the second vehicle occupant is directing attention to the first vehicle occupant based on whether the eye movement of the second vehicle occupant comprises focusing of the second vehicle occupant's eyes on the first vehicle occupant for at least the specified duration of time,
receiving, by a second microphone associated to the second vehicle occupant, an audio input from the second vehicle occupant in response to determining the second vehicle occupant is directing attention to the first vehicle occupant,
activating, by the audio communication controller, an audio augmentation of the received audio input from the second microphone to augment the audio input, and
outputting, by a second speaker associated to the first vehicle occupant, the augmented audio.

15. The audio communication method according to claim 13, further comprising:
determining, by the processor, a seating position of the first vehicle occupant in the vehicle.

16. The audio communication method according to claim 13, wherein the audio augmentation comprises a controlled increase of the audio input and/or a noise cancellation of the audio input.

17. The audio communication method according to claim 13, further comprising:
activating, by the processor, the first microphone in response to determining the first vehicle occupant is directing attention to the second vehicle occupant.

18. The audio communication method according to claim 13, wherein determining whether the first vehicle occupant is directing attention to the second vehicle occupant is further based on the processor being configured for face and/or lip recognition of the first vehicle occupant to recognize specific face expressions and/or lip movements of the first vehicle occupant for at least the specified duration of time which are indicative of directing attention, and/or the processor being configured for determining a position and/or movement of the first vehicle occupant to determine whether the position and/or movement of the first vehicle occupant for at least the specified duration of time is indicative of directing attention.

19. A computer program product comprising a non-transitory computer readable storage medium storing a computer program containing program instructions, that when executed on a computer or when loaded onto the computer, causes the computer to perform a method for communicating between vehicle occupants in a vehicle, the method comprising:
- monitoring, by an image capturing device, a second vehicle occupant,
- receiving, by a processor of the computer, an image of the second vehicle occupant from the image capturing device,
- determining, by the processor, whether the second vehicle occupant is directing attention to a first vehicle occupant from eye movement of the second vehicle occupant, the processor eye-tracking the second vehicle occupant to determine whether the second vehicle occupant is directing attention to the first vehicle occupant based on whether the eye movement of the second vehicle occupant comprises focusing of the second vehicle occupant's eyes on the first vehicle occupant for at least a specified duration of time,
- receiving, by a second microphone associated to the second vehicle occupant, an audio input from the second vehicle occupant in response to determining the second vehicle occupant is directing attention to the first vehicle occupant,
- activating, by an audio communication controller, an audio augmentation of the received audio input from the second microphone to augment the audio input, and
- outputting, by a second speaker associated to the first vehicle occupant, the augmented audio.

20. The computer program product comprising the non-transitory computer readable storage medium storing the computer program containing program instructions, that when executed on the computer or when loaded onto the computer, causes the computer to perform the method for communicating between vehicle occupants in the vehicle according to claim 19, the method further comprising:
- activating, by the processor, the second microphone in response to determining the second vehicle occupant is directing attention to the first vehicle occupant.

\* \* \* \* \*